United States Patent
Moreau

[15] 3,659,459
[45] May 2, 1972

[54] DEVICE FOR MEASURING THE PRESSURE OF A FLUID FLOWING IN A PIPE

[72] Inventor: Bernard Moreau, Nantes, France
[73] Assignee: Creusot-Loire, Paris, France
[22] Filed: June 2, 1970
[21] Appl. No.: 42,673

[30] Foreign Application Priority Data
July 4, 1969 France..................6922716

[52] U.S. Cl. ..............................73/388 R, 73/389
[51] Int. Cl. ..........................................G01l 7/00
[58] Field of Search...............73/388 R, 389, 63; 137/244

[56] References Cited
UNITED STATES PATENTS 2,734,378  2/1956  Meyers......................73/63
3,386,462  6/1968  Walters....................137/244

Primary Examiner—Donald O. Woodiel
Attorney—Cameron, Kerkam & Sutton

[57] ABSTRACT

A measuring device comprising an auxiliary pipeline for coupling between a main pipe whose pressure is to be determined and a second pressure source, the auxiliary pipeline including a pressure gauge and a calibrated orifice, the former nearest the main pipe.

3 Claims, 2 Drawing Figures

3,659,459
PATENTED MAY 2 1972
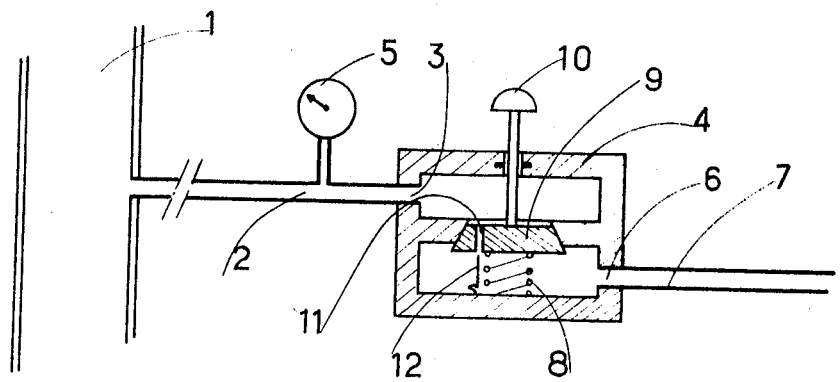
FIG 1
FIG 2
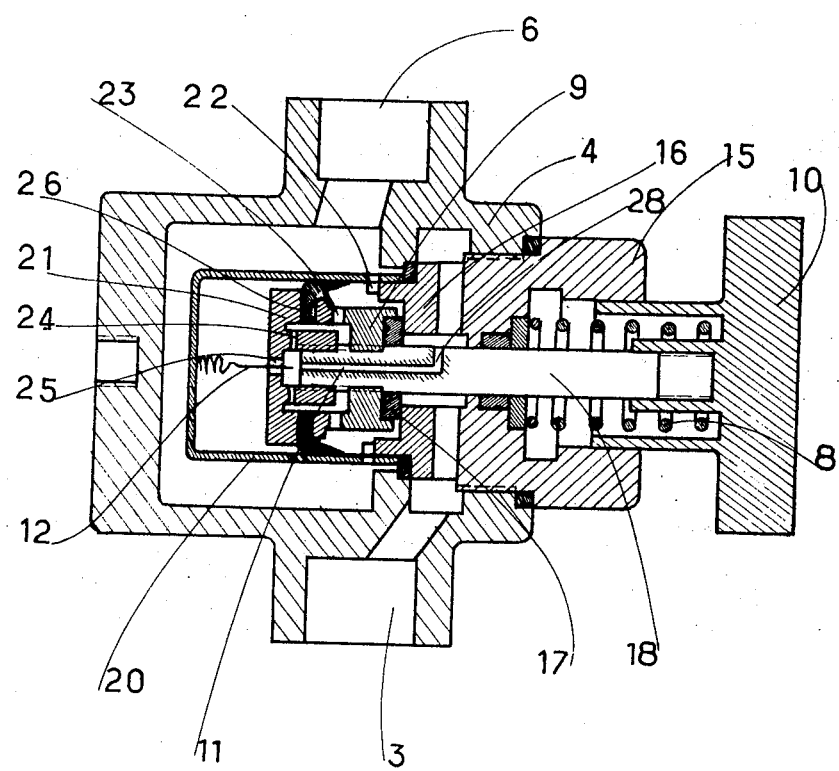

DEVICE FOR MEASURING THE PRESSURE OF A FLUID FLOWING IN A PIPE

This invention relates to a device for measuring the pressure of a fluid flowing in a pipe, intended more particularly, by way of example, to the measurement of the pressure of paper pulp in the supply and discharge pipes of refining machinery.

The paper pulp flowing in pipes of this kind is a dilute suspension of fibers in water, and the fibers are kept in homogenous suspension by the movement of the fluid in the pipe. If a pressure gauge is connected to a pulp flow pipe there is no rate of flow in the pipeline connecting the pipe to the pressure gauge itself. The pulp fibers tend to accumulate at the inlet to the connecting pipeline, which forms a calm zone, and thus rapidly cause clogging and falsify the pressure gauge readings.

This invention obviates any clogging of a pressure gauge connected to the pipe carrying the fluid whose pressure is to be measured, by means of an auxiliary small-diameter pipeline, and according to the invention the auxiliary pipeline is connected via a calibrated orifice to a source of a second fluid under pressure and the pressure gauge is connected to the auxiliary pipeline between the pipe and the calibrated orifice and near the latter, the pressure of the second fluid being constant and greater than the maximum value that the fluid flowing in the main pipe can assume.

The invention will now be described in greater detail with reference to a specific embodiment given by way of example and illustrated in the accompanying drawings wherein:

FIG. 1 diagrammatically illustrates the connection of the pressure gauge showing the principle of operation of the device; and FIG. 2 is a detailed view of a press-button valve used in such an installation.

Referring to FIG. 1, the pipe 1 is a supply or discharge pipe of a paper pulp refiner in which the pulp diluted in water flows. The small-diameter pipeline 2 is connected to the pipe 1 at one end while its other end is connected to the outlet 3 of a press-button valve 4.

A pressure gauge 5 is connected to the pipeline 2 near the valve 4.

The inlet aperture 6 to the valve 4 is connected by the pipeline 7 to a supply of water at constant pressure, the pressure being greater than the maximum value that the pressure of the pulp in the pipe 1 can assume.

When the valve 4 is in the inoperative position, the spring 8 holds the valve element 9 against its seat and pressure on the button 10 moves element 9 off its seat.

The valve element 9 has a small-diameter aperture 11 extending through it. A needle 12 is secured inside the valve 4 in the valve inlet chamber. The diameter of the needle 12 is slightly less than that of the aperture 11 and is disposed in line with said aperture. The length of the needle 12 is such that it is just flush with the inlet to the aperture 11 when the valve element 9 is in the closed position.

In an installation of this type, since the pressure of the water in the pipeline 7 is always greater than the pressure of the pulp in the pipe 1, there is a flow of water even when the valve 4 is closed, such flow extending via the aperture 11 and the pipeline 2. The rate of flow of water, which is limited to a few liters per minute as a result of the calibrated orifice 11, is sufficient to prevent any pulp from flowing back into the measuring pipeline 2, but in no way modifies the dilution characteristics of the pulp.

The pressure at the pressure gauge connection is equal to the pressure of the pulp in the pipe 1 plus the pressure loss produced in the portion of pipeline 2 situated between the pipe 1 and the pressure gauge connection due to the water flow. Of course the variations in the pulp pressure in the pipe 1 result in a variation of the flow of water through the orifice 11 and a corresponding variation in the pressure loss in this portion of the pipeline. However, within the acceptable accuracy limits this pressure loss can be considered as a constant, and in that case the readings of the pressure gauge 5 may be considered as indicative, to within a constant value, of the variations of the pressure of the pulp in the pipe 1.

In order to obviate any clogging which might ultimately occur as a result of slight flowback of pulp in the pipeline 2, or clogging as a result of impurities being deposited from the water flowing at a very low rate, the valve 4 enables the pipeline to be periodically cleaned by producing a high rate of expulsion water flow. For example, if the button 10 is actuated, the valve element 9 is completely moved from its seat and the rate of flow of pressure water arriving at 7 is no longer limited by a reduced orifice. A high rate of flow then occurs in the pipeline 2 and expels all the impurities therefrom. At the same time, the movement of the valve element 9 causes the needle 12 to penetrate into the calibrated orifice 11, and this also eliminates any impurities which might have formed thereon and reduced the section thereof.

FIG. 2 illustrates a practical embodiment of the valve 4 by modification of an existing type of press-button valve.

Referring to FIG. 2, the valve body 4 comprises an inlet port 6 and an outlet port 3 and bears a plug 15, of which the part 16 acts as a seat for the valve element. The valve element 9 together with a gasket 17 is connected to a rod 18 and operating button 10. The spring 8 urges the press-button 10 and the valve element 9 into the closed position.

When a valve of this type is used for the invention, its existing shock-absorber system is retained to obviate water hammer due to abrupt closure of the valve lid.

The shock absorber system comprises a cylinder 20 connected to the seat 16, the end part 21 of the valve element 9 acting as a piston sliding therein. The inside of the cylinder 20 communicates with the inlet chamber of the valve via ports 22 and the two surfaces of the piston 21 communicate via reduced-section ports 23, 24 and 25. The shape of the gasket 16 of the piston 21 allows a high rate of peripheral flow of water from one chamber of the cylinder 20 to the other solely in the direction corresponding to opening of the valve element 9. In the other direction of movement of the valve element 9, corresponding to its closure under the action of the spring 8, the gasket 26 forms a seal on the inside walls of the cylinder 20 and the flow of water into the other chamber of the cylinder 20 must be at a low rate through the ports 23, 24 and 25. The closing movement of the valve element 9 can not therefore be abrupt.

The rod 18 has a small-diameter axial orifice 11 leading via a radial portion 28 into the valve outlet chamber. The needle 12 is secured to the inner end of the cylinder 20, extends through the port 25 in which it is guided, and is flush with the outlet of the aperture 11.

The operation of the valve described in connection with FIG. 2 is similar to that described in principle in connection with FIG. 1. When the valve is in the closed position shown in the Figure, a flow of water occurs between the pressure water inlet 6 and the valve outlet 3 via the orifices or ports 22, 23, 24, 11, 28. This circuit has a considerable pressure loss and limits the rate of flow to a low value. When the press-button 10 is actuated, the flow is directly via the ports 22 and the central large-diameter port of the seat 16.

Similarly, when the rod 18 is driven in by the press-button 10 to open the valve fully, the needle 12 enters the calibrated orifice 11 and cleans it of any impurities which may have lodged therein.

Of course the invention is not limited to the single embodiment described by way of example but also covers other embodiments differing therefrom only in respect of detail. It is applicable to the measurement of the pressure of any fluid carrying particles which are liable to clog a pressure gauge and, depending upon the nature of such fluid, the second pressure fluid which cleans the measuring pipeline 2 could be other than water.

Similarly, the valve used could be of a type other than that described, provided that a calibrated leakage orifice can be formed in the valve element.

We claim:

1. A device for measuring the pressure of a fluid flowing in a pipe, comprising an auxiliary small-diameter pipeline one end of which has means for connection to the pipe, and the other end of which is adapted for connection to a source of a second fluid under pressure, a pressure gauge connected to the auxiliary pipeline, a calibrated orifice in the pipeline between the gauge and the said other end of the pipeline, the gauge being near the orifice, the gauge in operation being indicative of pressure in the pipe when the second fluid pressure exceeds the pressure in the pipe, the auxiliary pipeline including a valve having an element movable relative to a valve seat, the calibrated orifice being formed in the element, and the valve forming the connection for coupling to the second fluid source.

2. A measuring device according to claim 1, wherein the valve includes a needle in line with the calibrated orifice in the valve element and of a smaller diameter than said orifice, and so disposed that it enters the orifice when the valve element is moved off its seat and completely clears said orifice when the valve element is on the seat.

3. A measuring device according to claim 1 connected to a pipe carrying paper pulp and coupled to a second fluid source being a water supply.

* * * * *